United States Patent [19]

Kamenicky et al.

[11] 4,259,622

[45] Mar. 31, 1981

[54] CIRCUIT ARRANGEMENT FOR DRIVING AND FOR INDEPENDENT RECUPERATION BRAKING OF A VEHICLE

[75] Inventors: Jan Kamenicky; Jan Michl; Zdenek Sindelar; Stanislav Ibl; Jaroslav Salivar, all of Prague, Czechoslovakia

[73] Assignee: CKD Praha, oborovy podnik, Prague, Czechoslovakia

[21] Appl. No.: 854,622

[22] Filed: Nov. 25, 1977

[30] Foreign Application Priority Data

Nov. 25, 1976 [CS] Czechoslovakia ............... 7625-76

[51] Int. Cl.³ .................... H02P 3/00; H02P 3/14; H02P 7/68
[52] U.S. Cl. ...................................... 318/86; 318/88; 318/378
[58] Field of Search ............... 318/113, 56, 60, 63, 318/376, 378, 86, 87, 88, 89, 112

[56] References Cited

U.S. PATENT DOCUMENTS

| 3,601,670 | 8/1971 | Eriksson et al. ............... 318/112 X |
| 3,828,233 | 8/1974 | Brulard ........................... 318/376 X |
| 3,881,141 | 4/1975 | Narita ............................. 318/376 X |

Primary Examiner—Gene Z. Rubinson
Assistant Examiner—Richard M. Moose

[57] ABSTRACT

A circuit arrangement for the driving and for independent recuperation braking of a vehicle provided with DC compound traction motors, a DC feeding circuit, and pulse control for obtaining braking with so-called clean recuperation. The series windings of the motors and their armatures are connected to a tetragonal circuit with four terminals, with a pulse converter controlling the armature voltage of the motors.

1 Claim, 1 Drawing Figure

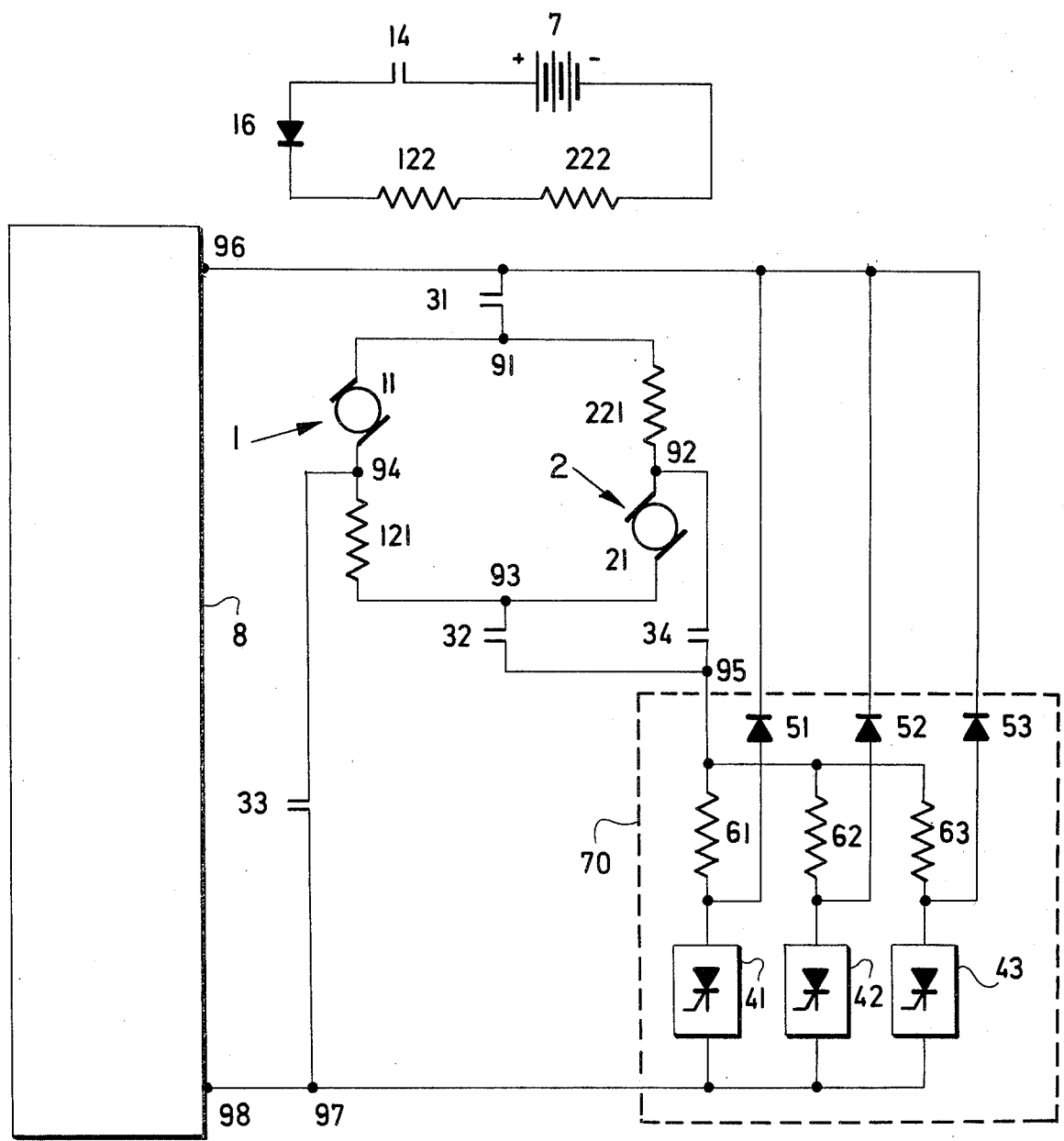

CIRCUIT ARRANGEMENT FOR DRIVING AND FOR INDEPENDENT RECUPERATION BRAKING OF A VEHICLE

BACKGROUND OF THE INVENTION

This invention relates to a circuit arrangement for the driving and independent braking of a vehicle provided with DC traction motors, a DC feeding circuit, and a pulse control.

There is a number of arrangements of electrical accessories of vehicles provided with pulse control; these are, however, mostly provided with a fully working operational mechanical brake, usually a pressure air brake, in addition to the electrical brake.

If there is no operational mechanical brake on the vehicle and the mechanical brake operates only as an emergency brake for final braking, the electrical brake has to be designed so as to engage reliably and to operate under all conditions which may occur in the feeding circuit, even in the case of a breakdown of the feeding voltage, of a short circuit of the trolley system, and in case the feeding circuit receives no power. Similarly, for saving power and for optimum design of the brake resistors, it is required that the fundamental braking be performed by a clean recuperation and that the resistance brake should operate solely as an emergency brake in case the feeding circuit is unable to provide the braking power.

These demanding requirements, however, raise a number of technical problems.

In the first place it is not feasible to use motors with separate excitation in the current connection, although they are otherwise most suitable for pulse control. When the exciting windings are fed solely from the trolley system, these motors cannot be excited in case of a breakdown of the trolley feeding voltage with a simultaneous requirement of braking. If the excitation current is fed over a source of an auxiliary DC voltage, for instance a battery on the vehicle, it is necessary that this battery shall supply all power for excitation required for braking the vehicle if the feeding trolley system breaks down. A battery is not capable of supplying the required power, as its size is limited by the available space on the vehicle, its weight, price and space requirements of the charging source. A combined excitation from a battery on the vehicle and later from the armature of the traction motor can also not be used, as the connection of the battery on the vehicle with the circuit of the armature of the traction motor or from the trolley feeding circuit only via semiconductor elements is not possible. Motors in series connection cannot be used either, because they start their generator operation at low rotating speeds rather unreliably.

The requirement for a clear recuperation within the whole speed range excludes the possibility of application of a dropping resistor and presupposes the maintenance of the armature voltage below the feeding voltage even at highest rotation speeds. This is practically impossible with a current interconnection of two motors in series.

Further, the braking torque of the highest speeds of rotation has to be independent of conditions of the feeding trolley voltage. It is therefore impossible to use a connection with an armature diode, in which case the dependence on the feeding trolley voltage is rather high.

SUMMARY OF THE INVENTION

It is an object of this invention to provide a circuit arrangement for the driving and independent recuperation braking of a vehicle with DC traction motors, with DC feeding and pulse control, which permits braking at any operating speed, which uses to the utmost recuperation of power for braking, and which also operates in case of a breakdown of the feeding source or in case the feeding source would be unable to consume the braking power.

According to this invention two series connected DC compound traction motors each provided with a series winding and a separate excitation winding have their first common terminals connected through a first drive contactor to a first feeding terminal of the feeding current source, the nominal voltage of which is higher than the nominal voltage of the armatures of the traction motors, the armature of the first DC traction motor being connected through the first common terminal of the two DC motors to the series winding of the second DC traction motor. The series winding of the first DC traction motor is connected via a second common terminal of the two DC traction motors to the armature of the second DC traction motor. The second common terminal of the two DC traction motors is connected through a second drive contactor to the input terminal of the pulse converter. The output terminal of the pulse converter is connected to the second feeding terminal of the feeding source. A first brake contactor is also connected to the output terminal of the pulse converter, the first brake contactor being connected through a third terminal to the armature of the first DC traction motor and to the series winding of this traction motor. A fourth terminal, connecting the armature of the second DC traction motor with the series winding of this motor, is connected through the second brake contactor to the input terminal of the pulse converter.

The separately excited windings of both DC traction motors are connected to a source of an auxiliary DC voltage through a contactor for increased excitation.

The pulse converter is a two phase non-oscillating converter with a common cummutation circuit.

The circuit arrangement for driving and independent recuperation braking according to this invention, provided with DC traction motors, DC feeding and pulse control, solves problems connected with a completely independent recuperation brake as well as problems of a suitable driving arrangement.

The interconnection of armatures and series windings to a tetragonal impedance feeding circuit provides a rather advantageous and reliable method even for a compound motor whereby the change-over from driving to braking is achieved with a minimum number of contacts. In case of braking, the same current always flows through the armature of one motor and through the series winding of the second motor, thus enabling a reliable parallel running of generators with a predominantly series characteristic.

One motor in series having its nominal armature voltage lower than the voltage of the trolley system, represents the conditions of a permanently down transformation enabling driving with full parameters even in the case of an allowed drop of voltage of the trolley system, and provides a wide range of the torque by the control of only the armature voltage.

A more detailed analysis shows that properly utilized traction motors, for instance for vehicles for city transportation, have a nominal voltage between 300 to 600 V so that without a permanent transformation for design for 300 V if both motors are in series, or for 600 V if one motor is connected to full voltage, they are not properly utilized. The circuit arrangement according to this invention with a permanent transformation downwards enables the use of motors at their optimum voltage and thus the best utilization of them permitted by their weight and dimensions.

The most significant advantage of the circuit arrangement according to this invention is that it permits a clean, i.e. a complete recuperation, as a critical approach of the armature voltage of DC traction motors to the voltage of the feeding source, wherein a clean recuperation is impossible, which occurs only exceptionally at highest speeds and low voltage of the feeding source. These cases have, of course, to be solved by some known methods, for instance by the disconnection of a line contactor, leading to an automatic response of the emergency resistance brake.

The winding with separate excitation connected to the source of an auxiliary DC voltage can be designed so that it imposes a load upon this source only to an acceptable extent. As the contactor for increased excitation is always closed in the course of starting, the brake can be reliably engaged even at the slowest speeds. By the disconnection of the contactor for increased excitation at the highest speeds, the excitation of the DC traction motor is reduced for driving and braking, whereby the already wide range of torque due to the permanent transformation of the armature voltage downwards is furthermore increased without the necessity of any further convertor for the regulation of the excitation.

The application of a non-oscillating two phase converter with a common commutation circuit offers further advantages. A converter of this kind fails to have the so-called "induction of the first oscillation", which in oscillating types of converters is transformed to a voltage on the commutating condenser to an extinction polarity. In the course of operation the inductivity of the first oscillation is the source of the highest additional losses in passive elements. For this reason oscillating converters are mostly used solely for the starting of the vehicle and for the most time, when the DC traction motor is already connected to the full voltage of the feeding source, these converters do not operate.

The non-oscillating two phase pulse converter with a common commutation circuit is not a source of additional losses. It is therefore suitable for conditions of a permanent transformation downwards, wherein any kind of this converter operates permanently.

By the application of the non-oscillating pulse converter, all the advantages of the invention become prominent. The circuit arrangement according to this invention is simple and also advantageous in costs.

DESCRIPTION OF THE DRAWING

The single FIGURE of the drawing illustrates an examplary embodiment of a circuit arrangement according to this invention for driving and independently braking with DC traction motors, DC feeding and pulse control.

DESCRIPTION OF THE PREFERRED EMBODIMENT

As traction motors a couple (series connected) of DC compound traction motors is used.

A first traction motor 1 has an armature 11, a series winding 121 and a separate excitation winding 122. The second traction motor 2 has an armature 21, a series winding 221 and a separate excitation winding 222. The armatures 11, 21 of these traction motors, which are as a rule mounted on a single bogie frame, are with their series windings 121, 221 connected to an impedance tetragon and are connected for driving and braking to an input terminal 95 of a pulse converter 70 by means of a second drive connector 32, connected through a second terminal 93 of the couple of traction motors, and further by a second brake contactor 34 connected to a fourth terminal 92 which connects the armature 21 and the series winding 221 of the second traction motor.

The first terminal 91 of the couple of traction motors is connected by a first drive contactor 31 to a first feeding terminal 96 of a DC feeding source 8. A third terminal 94, connecting the armature 11 and the series winding 121 of the first traction motor, is connected through a first brake contactor 33 to an output terminal 97 of the pulse convertor 70. Output terminal 97 is furthermore connected to a second feeding terminal 98 of the DC feeding source 8.

The pulse converter 70, shown in the drawing as a three-phase pulse converter, is connected through input terminal 95 to a common junction point formed by parallel connected induction coils 61, 62, 63. Contactless switches such as SCRs 41, 42, 43, also connected to a common junction point, are connected to the output terminal 97 of the pulse convertor 70. Zener diodes 51, 52, 53 of the pulse converter 70, connected to a common junction point, are connected to the first feeding terminal 96 of the DC feeding source 8. In the examplary embodiment shown, the separate excitation windings 122, 222 of both traction motors are connected in series and are connected to a source 7 of an auxiliary DC voltage via a diode 16 and a contactor 14 for increased excitation.

The described apparatus operates as follows:

In the course of driving the current flows from the first feeding terminal 96 of the DC feeding source 8 through the first driving contactor 31 and the first terminal 91 to the couple of traction motors and furthermore via the second terminal 93 of the couple of traction motors and the second drive contactor 32 to the input terminal 95 of the pulse converter 70, by means of which the armature voltage of both traction motors is controlled. In this circuit arrangement the armatures 11, 21 of the traction motors are connected with their series windings 121, 221, so that the same current always flows through the armature and series winding of each motor. The first and second brake contactor 33, 34 are in this case disconnected. If the traction motors have a predominantly series characteristic, their parallel interconnection is stable in the course of driving.

In the course of starting the separate excitation windings 122, 222 of both traction motors are connected by the closed contactor 14 for increased excitation to the source 7 of auxiliary DC voltage. The interconnection of one of the motors in series enables the controlling of the armature voltage to high values and thus also utilizing for driving the voltage reserve of the motor, which is normally utilized for braking only.

After the full voltage of the DC feeding source 8 is obtained on the armatures 11, 21 of the traction motors, it is possible to interrupt the current in the windings 122, 222 with separate excitation, whereby the already wide range of the torque of the motor is furthermore increased.

In the course of braking, the brake contactors 33, 34 are closed and the drive contactors 31, 32 are disconnected, so that the braking current always passes through one of the armatures 11, 21 of one of the traction motors and through the series winding 221, 121 of the second traction motor. When the traction motors have a predominantly series characteristic, this interconnection is stable in the course of braking.

The braking current flows, furthermore, through the pulse converter 70, controlling the magnitude of the braking current, and the braking power is returned via the zener diodes 51, 52, 53 to the DC feeding source 8. Thus the circuit arrangement shown does not consume the braking power in the case of a breakdown of the DC feeding source 8 or if no lead is connected to this source 8. This can be accomplished, however, by any of a number of known circuit arrangements, for instance by a series combination of a contactless thyristor switch and of a resistor, the series combination being connected in parallel with the DC feeding source 8.

At the start of braking the separately excited windings 122, 222 are connected for increased excitation to the source 7 of auxiliary DC voltage via the contactor 14, thus enabling a reliable starting of braking even at the lowest speed of the traction motors. At high speed of the motors, the separately excited windings 122, 222 can be again disconnected.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. Circuit arrangement for the driving and independent braking of a vehicle, comprising two series connected DC compound traction motors, said traction motors each having an armature and a series winding and a separate excitation winding, a DC feeding source with a first and second feeding terminal, the nominal voltage of the DC feeding source being higher than the nominal voltage of the armatures of the traction motors, a pulse converter with an input terminal and an output terminal, a first and a second driving contactor, a first and a second brake contactor, four terminals interconnecting the armatures and series windings of both DC traction motors, circuit means connecting the first terminal of the DC traction motors through the first driving contactor to the first feeding terminal of the DC feeding source, circuit means connecting the armature of the first traction motor through said first terminal of DC traction motors to the series winding of the second traction motor, circuit means connecting the second terminal of the DC traction motors through the second driving contactor to the input terminal of the pulse converter, circuit means connecting the series winding of the first traction motor through the second terminal to the armature of the second traction motor, circuit means connecting the output terminal of the pulse converter through the first brake contactor to the third terminal of the DC traction motors, circuit means connecting the armature of the first traction motor through the third terminal to its series winding, circuit means connecting the input terminal of the pulse converter through the second brake contactor to the fourth terminal of DC traction motors, circuit means connecting the armature of the second traction motor through the fourth terminal to its series winding, circuit means connecting the output terminal of the pulse converter to the second feeding terminal of the DC feeding source, an auxiliary DC source including a further contactor for increased excitation and a diode connected in series, and circuit means connecting the separate excitation windings of the DC traction motors through the further contactor and the diode to the auxiliary DC source.

* * * * *